May 25, 1926.
A. R. LONG ET AL
FRUIT JUICE EXTRACTOR
Original Filed July 11, 1922      6 Sheets-Sheet 2
1,586,095
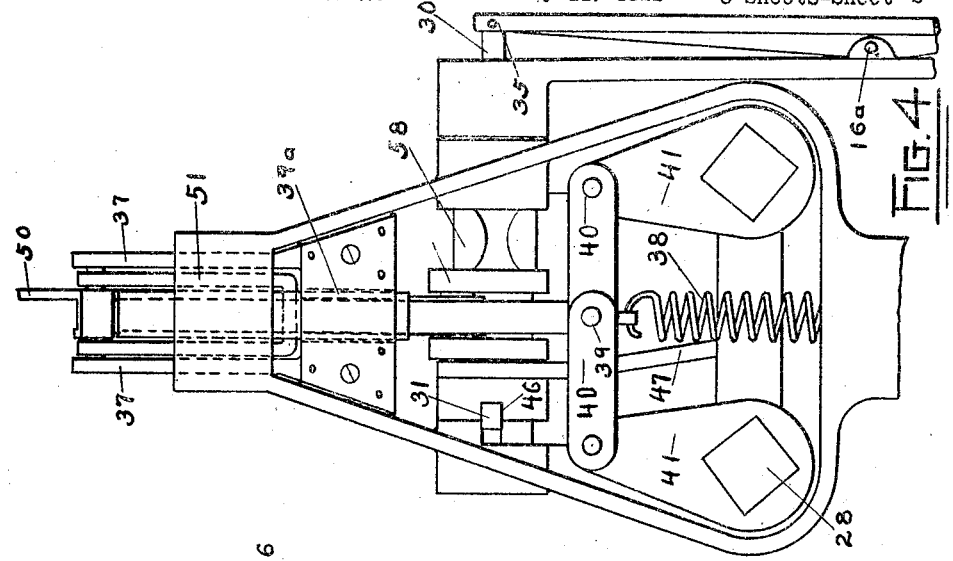
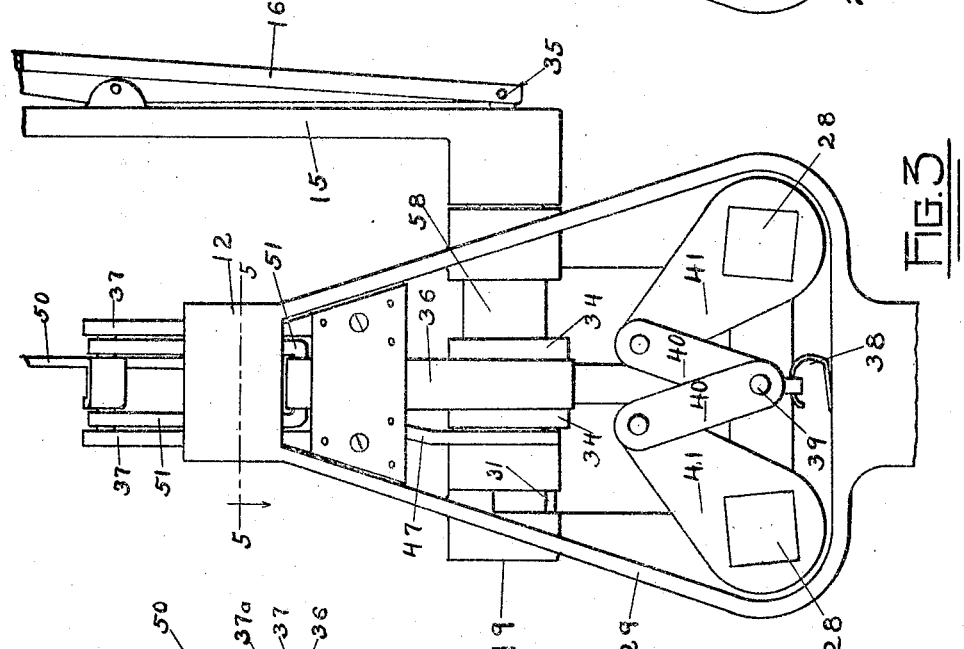
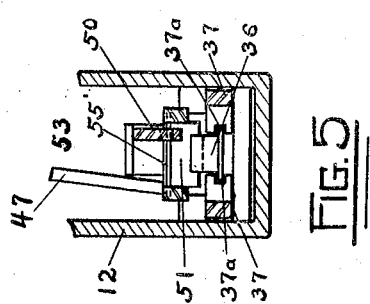
Albert R. Long and
Ralph P. Clarkson  INVENTORS.
BY R. P. Clarkson
ATTORNEY.

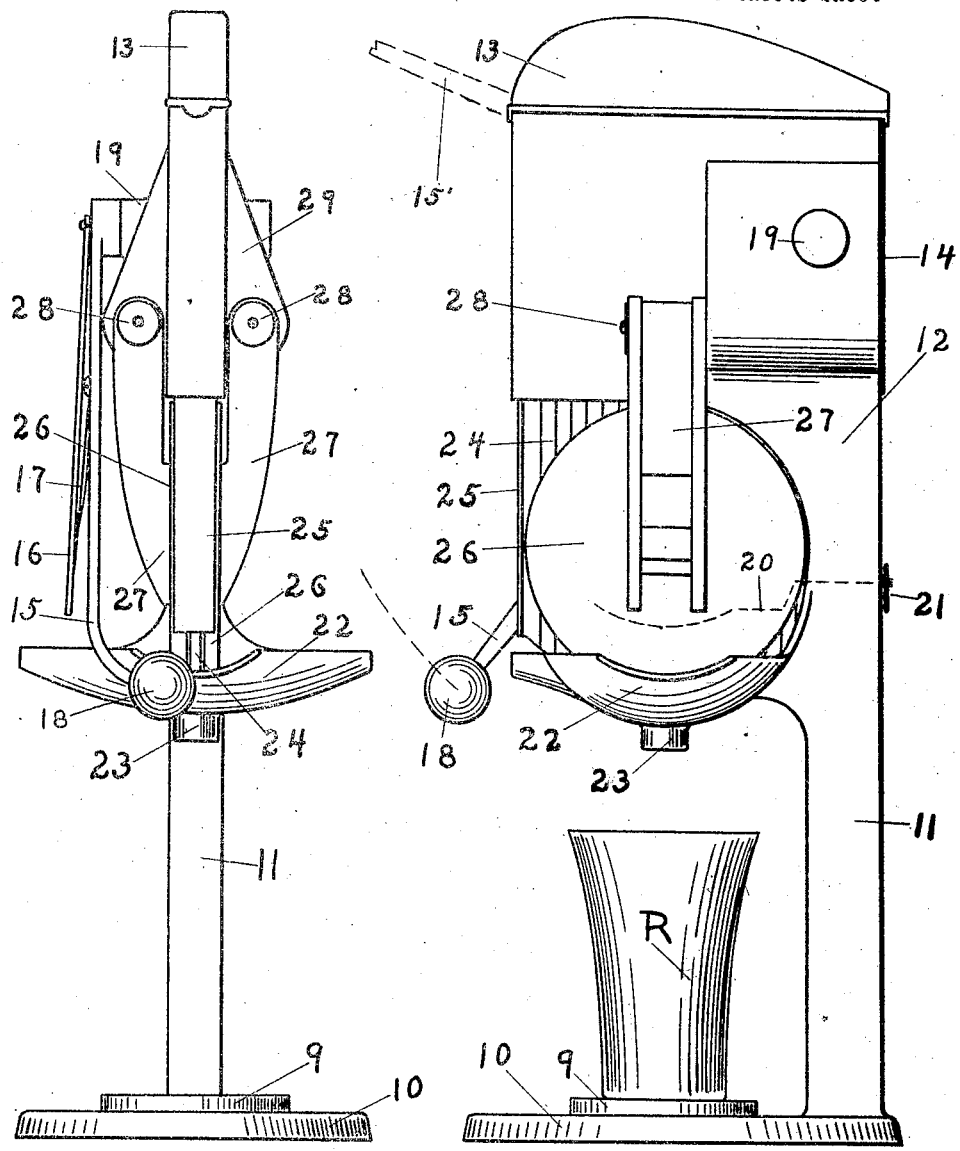

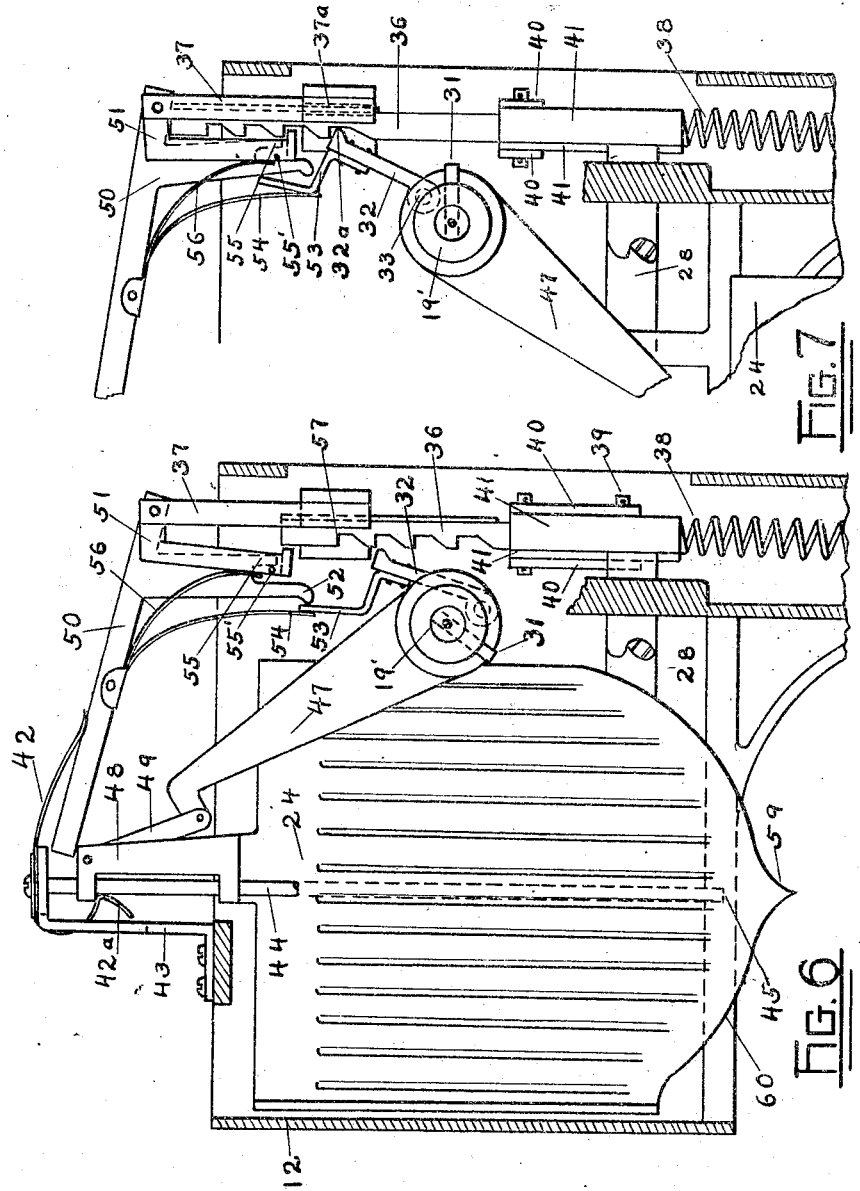

May 25, 1926.
A. R. LONG ET AL
1,586,095
FRUIT JUICE EXTRACTOR
Original Filed July 11, 1922    6 Sheets-Sheet 4
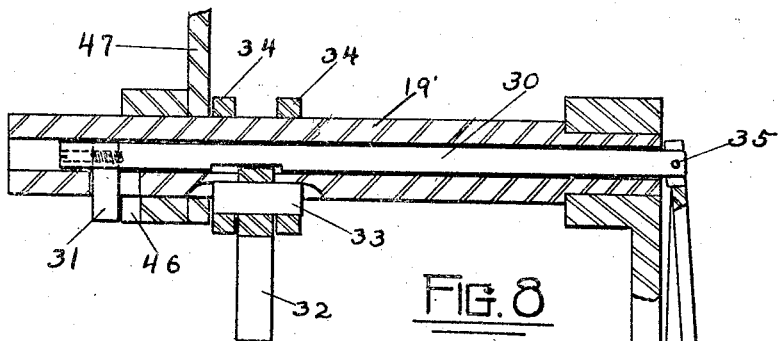
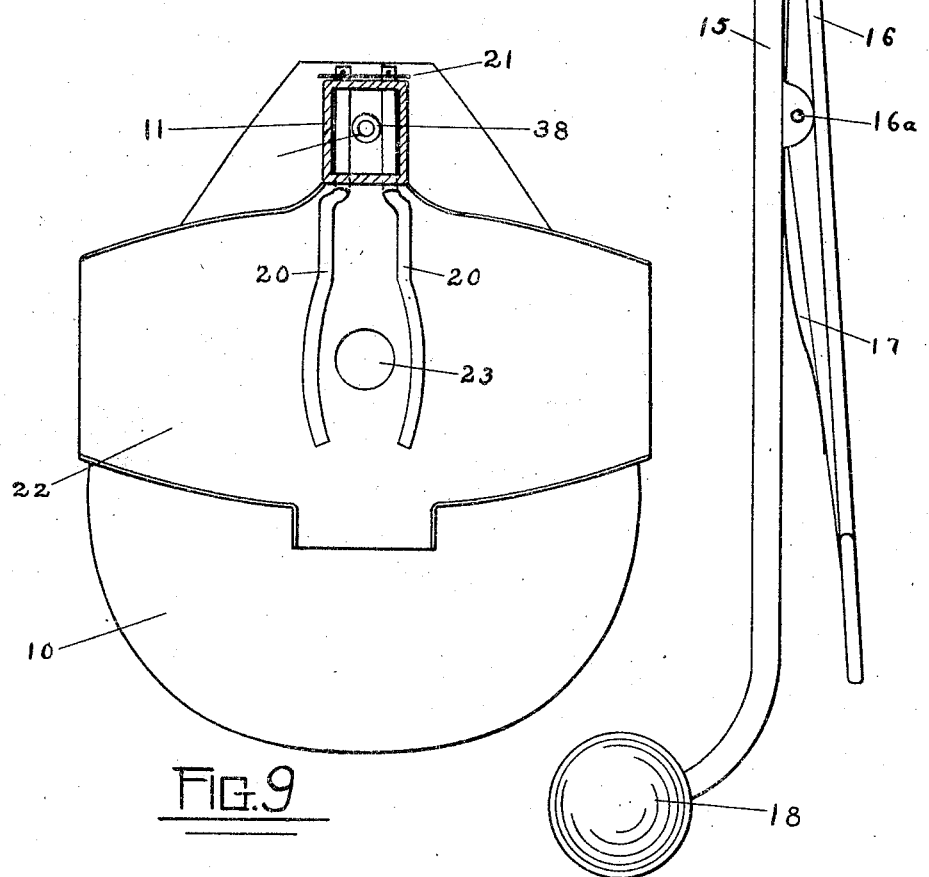

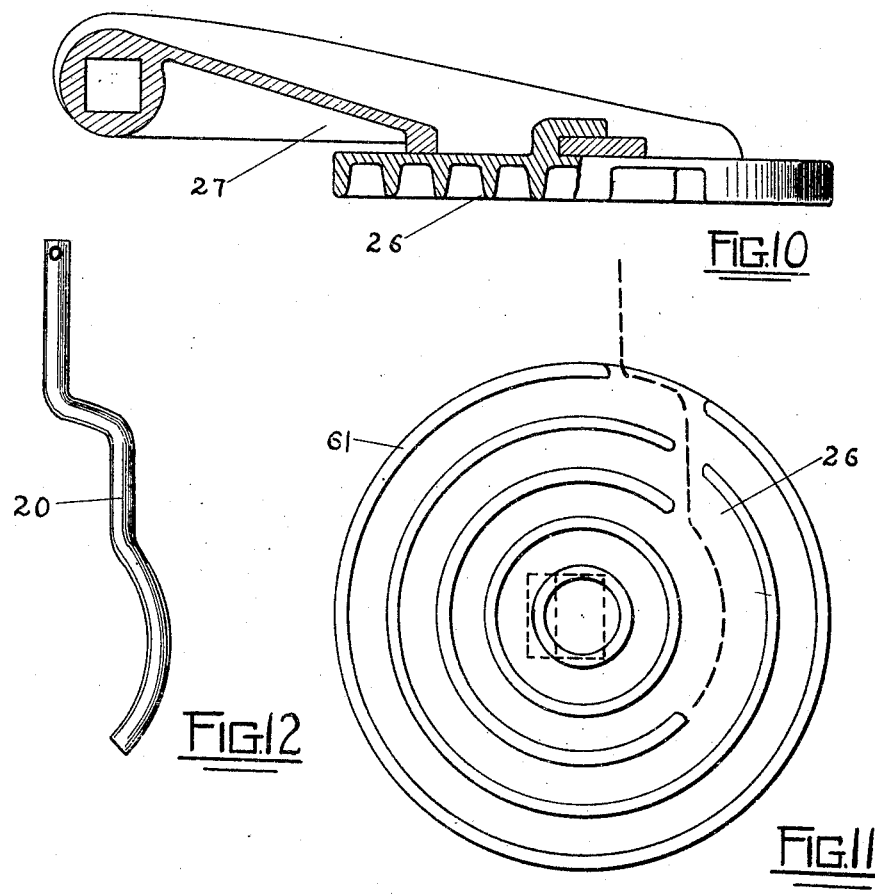

May 25, 1926.

A. R. LONG ET AL

FRUIT JUICE EXTRACTOR

Original Filed July 11, 1922   6 Sheets—Sheet 6

1,586,095

Albert R. Long
Ralph P. Clarkson   INVENTORS.

BY R. P. Clarkson

ATTORNEY.

Patented May 25, 1926.

1,586,095

UNITED STATES PATENT OFFICE.

ALBERT R. LONG, OF NEW YORK, AND RALPH P. CLARKSON, OF NEW ROCHELLE, NEW YORK, ASSIGNORS TO LEIGH BEST, OF NEW YORK, N. Y.; SAMUEL T. CALLAWAY EXECUTOR OF SAID LEIGH BEST, DECEASED.

FRUIT-JUICE EXTRACTOR.

Application filed July 11, 1922, Serial No. 574,334. Renewed January 19, 1926.

Our invention relates to devices for extracting the juice from fruit such as, for example, lemons, oranges, pineapples, grapefruit and the like and it is an object of our invention to provide a device simple and rugged in construction, reliable in operation, and which will perform its function in a clean and sanitary manner.

It is a further object of our invention to provide a device into which a whole fruit may be placed and in the operation of which device the juice will be extracted from said fruit, the desired halving of the fruit being done in the operation of the device embodying our invention.

It is another object of our invention to provide a device which will extract the fruit juice and juice sacs from a desired fruit but which will withhold the pulp and fibre of the fruit.

It is a still further object to provide a device which will not only extract from citrus fruits the maximum amount of fruit juice but will also extract from the skin of the fruit a small amount of the oil therein contained thus giving to the juice a particularly desirable flavor and odor.

Still other objects are the provision of means whereby the extracted juice flows directly from the interior of the fruit to the receptacle positioned to receive it without flowing over the surface of the fruit nor in any manner coming in contact with the operator's hand or any portion of the device touched by the operator; the provision of means whereby the withheld pulp and fibre is retained within the skin of the fruit and removed by the operator therewith in a single substantially dry mass; the provision of means whereby the function of the device is performed without mashing up the skin of the fruit in any way to permit the extracted juice to contact with or pass over the outer surface thereof; the provision of means to retain the seeds of the fruit within the skin thereof; to cleanse the halving knife with the interior of the skin; and to protect the operator from the juice reaching his person or clothing.

With the foregoing and other objects in view as will be apparent as the description proceeds, our invention resides in the combination of parts and arrangement thereof and in the details of construction described in the specification and particularly pointed out in the appended claims, a preferred embodiment of our invention being shown in the accompanying drawings. It is to be understood, however, that we do not limit ourselves to the precise embodiment shown and described as changes may be made within the scope of what is claimed without departing from the spirit of the invention. We intend no limitations other than those of the claims.

In the accompanying drawings—

Fig. 1 is a front view of a preferred embodiment of our invention.

Fig. 2 is a side elevation of the device of Fig. 1 showing a receptacle in place to receive the extracted juice.

Fig. 3 is a rear elevation of the operating mechanism of the device of Fig. 1, back plate and cover removed.

Fig. 4 is a rear elevation of the operating mechanism of the device of Fig. 1, similar to that of Fig. 3 but with the parts in the position reached at the end of the final down stroke of the operating lever.

Fig. 5 is a horizontal section through the top of the housing on the line 5—5 of Fig. 3.

Fig. 6 is a side vertical elevation of the mechanism of the device of Fig. 1 with the housing broken away, the parts being in inactive position before the beginning of operation.

Fig. 7 is a view similar to that of Fig. 6 with parts broken away to show the actuating mechanism at the end of the final down stroke of the operating lever.

Fig. 8 is a sectional assembly of the operating lever and connected parts.

Fig. 9 is a plan view of the juice trough and fruit support and base of the device of Fig. 1.

Fig. 10 is a side view, partly in section, showing the construction of the squeezing plates and their mounting.

Fig. 11 is a face view of the pressure surface of the squeezer plates.

Fig. 12 is a detail view of one of the fruit support members.

Figs. 13 and 14 are top and edge views, respectively, of the cutting knife.

Figure 15:
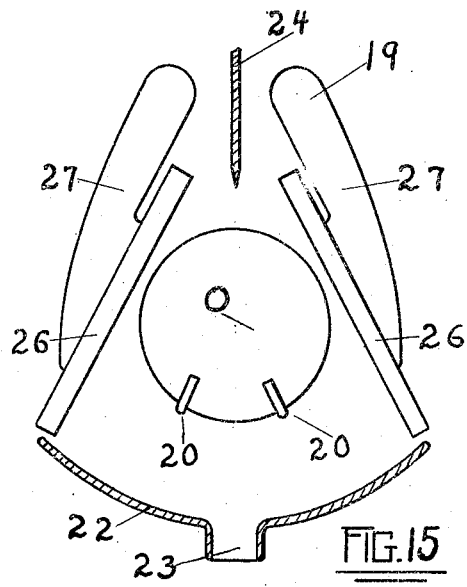
Figure 16:
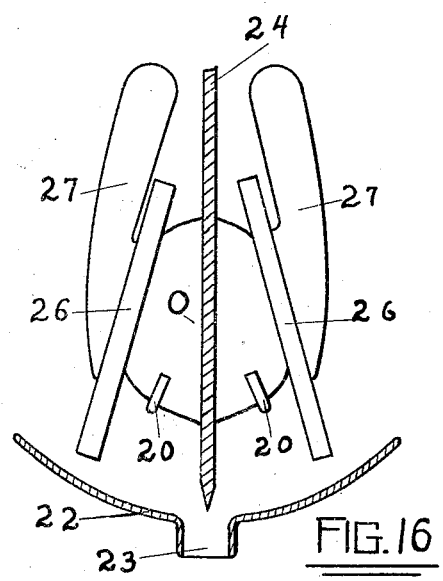

Figs. 15, 16, 17, and 18 are front views, more or less in outline, of the positions of the knife and squeezing plates at various points in the operation of the device of Fig. 1.

Similar reference characters relate to similar parts throughout the views.

In the preferred embodiment of our invention as shown in Fig. 1 and Fig. 2 there is a base portion 10, in this case acting as a stand for the device, in which is set a drip-pan 9 on which is placed a receptacle as R (Fig. 2) for the reception of liquid from the device in use. Rising from base 10 is a standard 11 acting as a support for a housing 12 closed by a top cover 13 and a back plate as at 14. Within housing 12 is positioned the mechanism of the device which will be described, actuated by the operation of a lever 15 having a ball grip as at 18 which moves substantially in the center plane of the device so that force applied thereto has a minimum of tipping tendency. On the lever 15 is mounted a release grip 16 spring pressed outward as by a resilient member 17, for purposes to be described. The movement of lever 15 is arcuately up and down between positions 15 and 15' (Fig. 2) about the center line of the bearing therefor at 19.

A fruit support is positioned as at 20 (Figs. 2, 9 and 12) comprising two members resiliently connected as by a hairpin spring 21 so that the two members 20, 20 may be pressed together although normally held apart by said spring 21.

Below said fruit support is a juice trough 22 supported in this case on standard 11 and having a spout or discharge opening as at 23 for the juice and oil to flow through downward into any receptacle R such as the glass shown (Fig. 2).

Above the juice trough 22 and centrally positioned is a knife 24 having a flat front flange 25. In Figs. 1 and 2 knife 24 is shown in down position between squeezer plates or discs 26, 26, mounted on either side of said knife 24. Each of said squeezer plates 26 is removably mounted on an arm 27 pivoted on a shaft 28 supported in a wing 29 of the housing 12.

Turning now to Figs. 15, 16, 17, and 18 in conjunction with Figs. 1 and 2, a preliminary disclosure of the use of a device such as illustrated embodying our invention, may be made in order to facilitate a detailed description of the preferred mechanism by which our objects may be accomplished.

The particular embodiment of our invention herein shown and described is designed for hand operation and for use at soda fountains, in hotels, restaurants, bakeries and private homes and other places where it is desired to extract the juice from fruit and in this connection we will describe the device as applicable to oranges merely for illustrative purposes. The fruit, in this case an orange, is positioned on the fruit support members 20, 20, above the juice trough 22, the lever 15 being up or in the dotted position of Fig. 2, the knife 24 being up and the squeezer plates 26 being separated in wide open position. These positions of the various parts as described is clearly shown in Fig. 15, the fruit being designated O. In this and the following figures the flat front flange 25 of knife 24 is cut away to permit a view of the parts.

On the first downward stroke of lever 15 the release grip 16 is inwardly pressed as by the operator's thumb, to engage knife 24 as will be explained. On this stroke knife 24 passes through the fruit O, said fruit being held up by the rigidity of fruit support members 20, 20. At the same time squeezer members 26, 26, close in slightly on the divided portions of the fruit and hold them firmly against knife 24 on each side or face thereof. The position of the parts at the end of the first downward stroke is shown as described in Fig. 16.

Figure 17:
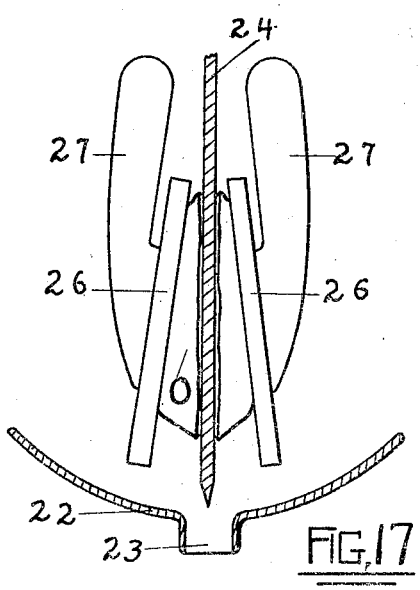

At this point grip 16 is released and knife 24 thereby disengaged from the operating lever 15 so that it remains down. Lever 15 is raised and a second stroke taken which results in squeezer plates 26 closing in firmly on the divided portions of the fruit or orange O and pressing said portions against the faces of knife 24 thus expressing juice from the divided portions of the fruit, the juice being directed from trough 22 through the discharge opening at 23. The position of the parts at the end of this stroke is shown in Fig. 17.

Figure 18:
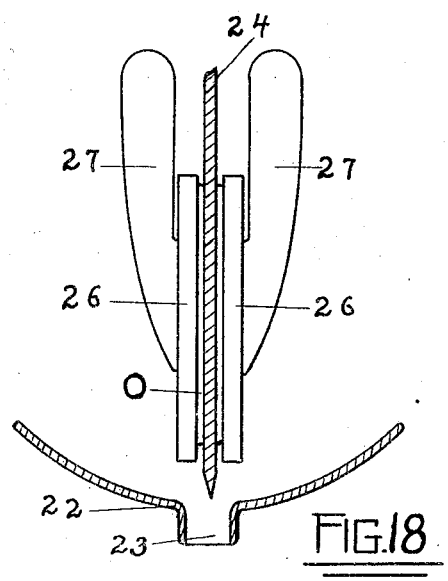

On the final stroke downward the knife 24 still remains stationary and the squeezing plates close up with very great pressure on the divided portions of the fruit and press them substantially dry, the parts being shown in Fig. 18 at the end of this stroke. At the end of this stroke, however, grip 16 is again inwardly pressed and the knife 24 engaged thereby before commencing the final up stroke of lever 15. The resulting action is that the knife is lifted and withdrawn from the fruit while the fruit is still under great pressure but not maximum pressure as the latter is relieved slightly upon the beginning of the up stroke. This action causes the pulp and skin or rind to wipe the knife. At the extremity of the up stroke, by means of mechanism to be described, the squeezer plates are relieved and spring open to the position shown in Fig. 15. Upon removal of the fruit skin or rind which retains pulp and seeds the device is ready for another operation.

Turning now to the mechanism by which this sequence of operation is obtained in this particular embodiment of our invention there is shown (Fig. 8) an assembly of lever 15, release grip 16 and shaft 19' on the end of which lever 15 is forced or otherwise affixed. We have found that squaring the shaft end to fit a square hole in lever 15 very satisfactory. Preferably shaft 19' is tubular and through it extends a detent shaft or rod 30 to which is affixed a knife detent 31 which has a motion axial of shaft 19' (Fig. 4) as will be explained. Also there is a link 32 (see also Figs. 6 and 7) through an end of which passes a pin 33. Shaft 19' has in its periphery a semi-cylindrical groove axially positioned somewhat as a keyway, into which pin 33 fits. Similar semi-cylindrical slots in washers 34, 34, fit over the outside of pin 33 when said washers are slipped over shaft 19', one on either end of pin 33. The effective action of this construction is to tie the link 32 to shaft 19' directly but with the effect of a crank arm from the center of shaft 19' to the center of pin 33. The movement of this crank and through it the movement of link 32 is determined by the motion of lever 15. The sliding motion of detent 31 is given by the actuation of the grip 16 to which rod 30 is pivotally affixed as at 35.

The two extremes of motion of link 32 are shown clearly in Figs. 6 and 7, the former being the lower position taken when lever 15 is at the upper end of its throw and the position in Fig. 7 being that taken by link 32 with lever 15 at its lower position at the end of a down stroke. The free end of link 32 coacts as a pawl 32ª with vertically positioned rack 36 which is guided in grooves 37ª in the lower portions of the vertical support posts 37. Rack 36 has affixed thereto at its lower end a resilient member 38, preferably a long coiled spring, the lower end of which is fastened underneath base 10, said resilient member passing down through the entire length of standard 11. The tendency of this resilient member 38 is to hold the rack down.

Also affixed pivotally as by a pin 39 to the lower end of rack bar 36 are toggle links 40, the other end of links 40 being similarly pivotally pinned to toggle crank arms 41 affixed to the rear ends of shafts 28 to the forward ends of which the squeezing plate arms 27 are affixed. It is apparent therefore that the actuation of rack bar 36 by pawl 32 by means of lever 15 actuates shafts 28 and the squeezer plates 26 affixed thereto.

Normally when the device is inactive knife 24 is held in upper position by a spring latch 42ª at one end of a spring 42 which is supported on a brace 43 affixed to housing 12. The brace 43 also acts to support the upper ends of knife guides 44, the lower ends of which are held in recesses at 45 in the interior of the housing 12. When it is desired to pass the knife downward, grip 16 is pressed and rocking on its pivot 16ª draws detent 31 into a recess 46 (Fig. 4) in the hub of knife lever arm 47 which is freely supported on shaft 19'. Pivotally connected to lever arm 47 and to the head 48 of knife 24 is a connecting link 49. With grip 16 depressed lever arm 47 moves with shaft 19' and carries downward permitting a bar 50 to fall by gravity action aided by pressure of a resilient member 42, previously mentioned, one end of which presses on bar 50 (Fig. 6). Bar 50 and stirrup 51 are both pivotally supported (Figs. 7 and 6) on support posts 37. As the bar 50 drops a detent end 52 thereof moves out of the path of the detent arm 53 affixed to pawl 32 which pawl under the aid of pressure from resilient member 54 affixed to bar 50, is permitted to engage rack 36 for the purpose of actuating said rack in a manner previously mentioned. When bar 50 is up as shown in Fig. 6 an arm 55 engages a pin 55' on stirrup 51 holding said stirrup away from rack 36 but when bar 50 drops this detent is also removed as arm 55 moves away from pin 55' and permits the stirrup 51 to act as a catch or latch under the pressure of a resilient member 56 also affixed to bar 50.

To describe again the operation of the device shown herein as an embodiment of our invention, with special reference to the coaction of the mechanism, Fig. 6 shows all parts at the beginning of the first stroke downwards of lever 15. The fruit is put in place and grip 16 depresses whereupon detent 31 enters a recess in the hub of knife lever 47 and makes that lever turn with shaft 19', forcing knife 24 out of contact with latch 42ª and downward at the same time permitting pawl 32 to engage rack 36 and raise it against the tension of spring 38 thus raising pin 39 from the position of Fig. 3 and by means of toggle links 40 turning cranks 41, shafts 28 and through arms 27 bringing the squeezer plates 26 together to the position of Fig. 16, the length of the travel of pawl 32 being enough to raise rack 36 to such position that latch 51 will drop into a recess 57 in the rack and retain rack 36 in its initial raised position. Grip 16 now being released by the operator, the knife lever 47 is no longer connected with shaft 19' and lever arm 15 so that it stays down in the position of Fig. 7. Lever 15 being uplifted for another stroke withdraws pawl 32 from the tooth of rack 36 first engaged and lowers the pawl 32 until another tooth on rack 36 is engaged thereby. The next two strokes of lever 15 each raises rack 36 a tooth by reason of the engagement therewith of the pawl 32 and each time latch 51 functions to retain the rack in its upper position. Any further strokes of lever 15 are futile, however, as but three teeth are cut in the rack 36 and no further engagement of pawl 32 therewith is possible. If now, the knife is withdrawn on an up stroke of lever 15 by depressing grip 16 and engaging knife lever 47, the said knife 24 at the upper extremity of its travel raises bar 50 and arms 55 and 52 respectively kick out latch 51 and pawl 32 freeing rack 36 from engagement therewith so that the tension of spring 38 acts to pull the said rack down, breaking the toggle set and opening up the squeezer plates to initial position.

In this position, with the knife up, any operation of lever 15 is also futile as the pawl 32 is held out of engagement with rack 36 so long as the knife 24 is up. It is apparent, therefore that only the sequence of events described and desired in the operation of the device is possible with the device herein disclosed. At any time, however, as is apparent, the knife may be withdrawn by depressing the grip 16, whether on one stroke of lever 15 or another, but in each case the device will be left for the proper sequence of action. It is further noticeable that with the knife 24 down, the squeezer plates 26 may be brought together by hand, if desired, up to the point where pressure is desired and then the remainder of the motion of said plates accomplished by actuation of lever 15. It is also apparent that although the consecutive strokes of lever 15 and of pawl 32 are equal, the leverage acting is increasing always because of the toggle action of links 40 so that the final leverage obtained is relatively very large.

Turning now to the specific construction of knife 24 as used in this embodiment of our invention, the cutting portion of said knife comprises a penetrating point 59 provided for ease in starting the cutting action, and a curved edge receding therefrom so that the cutting of the fruit is accomplished by a shearing action of the blade edge. Extending from the cutting edge longitudinally of the knife are a plurality of ridges and grooves on each face of said knife (Fig. 14) which have the function first of releasing the pressed out juice and permitting its downward flow towards the juice trough and secondly, preventing the spreading and to some extent the splitting of the divided portions of the fruit, thus breaking up the meat of the fruit without releasing large pieces of the fruit meat. The pulp and pips or seeds are thereby held in place and embedded in the rind of the fruit as it is pressed.

Similarly concentric alternate grooves and ridges are formed on the pressure faces of the squeezer plates 26 (Fig. 11), one ridge 61 being at the outer edge of the surface, preferably. These ridges and grooves perform a function not only of helping to prevent the spread of the divisions of the fruit but also of breaking the skin of the fruit, such as an orange, so that a small amount of oil is released from the skin and permitted to flow inwardly and out with the juice, the outer surface of the fruit remaining substantially dry. The distance these ridges are apart and their depth may vary somewhat but we have found that on a five inch disc a depth of ¼ inch and a center distance between consecutive ridges of about ½ inch give good results.

Preferably the ridges described are cut away at points to permit the fruit support members 20 to enter therein and lay against the plate surface along the dotted line of Fig. 11 when the squeezer plates are forced up against the knife blade. Members 20 are themselves preferably rigid, rotatably mounted in column 11 and held apart normally by spring 21.

What we claim is:

1. In a device of the character described fruit supporting means, means for dividing a fruit positioned on said supporting means, and a plurality of laterally movable squeezing plates operatively connected with said dividing means.

2. In a device of the character described fruit supporting means, a knife positioned directly above said supporting means in inoperative position, a squeezing plate operatively positioned at either side of said fruit supporting means, and actuating means operatively connected with both said knife and said squeezer plates to move said knife vertically and said plates laterally.

3. In a device of the character described fruit supporting means comprising laterally movable resilient members, means for dividing a fruit positioned on said supporting means comprising a knife adapted and arranged to pass through said fruit, and a squeezing plate positioned at either side of said fruit supporting means adapted and arranged to close in on said knife when said knife has passed through said fruit, and actuating means operatively connecting said knife and squeezer plates.

4. In a device of the character described fruit supporting means comprising resilient members, a juice trough positioned below said members, means for directing the flow of juice from said trough, means for dividing a fruit positioned on said support, and means for expressing juice from the divisions of said fruit and means adapted to withdraw said dividing means and then release said juice expressing means.

5. In a device of the character described means for supporting a fruit, means for dividing fruit so supported, means for expressing juice from such fruit and oil from the skin of such fruit, and means for withdrawing said dividing means before the release of said juice expressing means.

6. In a device of the character described, a shaft, an actuating lever affixed thereto, a recess in said shaft, a pin in said recess, a link movably affixed to said pin, and a pair of washers fitting said shaft slidably and engaging said pin.

7. In a device of the character described, a tubular shaft, a rod slidably affixed therein, a lever affixed to said shaft, a release grip lever pivotally supported on said first mentioned lever and engaging said rod, a detent affixed at the inner end of said rod whereby the actuation of said release grip lever moves said detent axially of said first mentioned lever.

8. In a device of the character described, a structure as defined in claim 7 and in addition a knife lever freely mounted on said shaft adjacent said detent, and means whereby the movement of said detent engages said knife lever.

9. In a device of the character described, a tubular shaft, a rod slidably affixed therein, a lever affixed to said shaft, a release grip lever pivotally supported on said first mentioned lever and engaging said rod, a detent affixed at the inner end of said rod whereby the actuation of said release grip lever moves said detent axially of said first mentioned lever, a knife lever freely mounted on said shaft adjacent said detent, means whereby the movement of said detent engages said knife lever, a knife affixed operably to said knife lever, a latch normally engaging said knife in inactive position, a bar engaged by said knife in inactive position, detent members on said bar, a rack, a pawl operably connected to said tubular shaft, and means whereby the actuation of said knife from latched position permits movement of said bar and of said detent members and an engagement of said pawl and said rack.

10. In a device of the character described, means for supporting a fruit, mechanism adapted and arranged to divide and to express juice from said fruit, operating means for said mechanism requiring a multiplicity of strokes to complete its cycle, and means whereby all said mechanism is restored to its initial position when a portion thereof is actuated on a reversed cycle.

Signed at New York city in the county of New York and State of New York this 10th day of July, A. D. 1922.

ALBERT R. LONG.
RALPH P. CLARKSON.